US008327422B1

(12) United States Patent
Friedman et al.

(10) Patent No.: US 8,327,422 B1
(45) Date of Patent: Dec. 4, 2012

(54) AUTHENTICATING A SERVER DEVICE USING DYNAMICALLY GENERATED REPRESENTATIONS (75) Inventors: Lawrence N. Friedman, Arlington, MA (US); Paul A. Dennis, Wayland, MA (US)

(73) Assignee: EMC Corporation, Hopkinton, MA (US)

( * ) Notice: Subject to any disclaimer, the term of this patent is extended or adjusted under 35 U.S.C. 154(b) by 1104 days.

(21) Appl. No.: 12/238,756

(22) Filed: Sep. 26, 2008

(51) Int. Cl.
    *G06F 7/04* (2006.01)
(52) U.S. Cl. .............. 726/5; 726/10; 713/168; 713/171
(58) Field of Classification Search .................. None
    See application file for complete search history.

(56) References Cited

U.S. PATENT DOCUMENTS

| 7,409,705 B2 * | 8/2008  | Ueda et al. ............... 726/5 |
| 7,546,276 B2   | 6/2009  | Randle et al. |
| 7,555,784 B2   | 6/2009  | Cameron et al. |
| 7,616,764 B2   | 11/2009 | Varghese et al. |
| 7,631,191 B2   | 12/2009 | Glazer et al. |
| 7,650,497 B2   | 1/2010  | Thornton et al. |
| 7,757,275 B2 * | 7/2010  | Crall et al. ............. 726/5 |
| 7,973,607 B1 * | 7/2011  | Ciaffi et al. ............ 331/16 |
| 8,117,458 B2 * | 2/2012  | Osborn et al. .......... 713/183 |
| 2007/0220253 A1 * | 9/2007 | Law ...................... 713/168 |
| 2010/0064360 A1 * | 3/2010 | Lin et al. ................ 726/9 |

OTHER PUBLICATIONS

Yahoo, "Don't talk to strangers (especially phishers)", Phishing Tips/Email Phishing Prevention/ Anti-Spam—Yahoo! Mail, http://antispam.yahoo.com/phishgingtips, pp. 1.
Id Proxy, "About idproxy.net", http://idproxy.net/about, pp. 1.
Monster ID, Monster ID [splitbrain.org], http://www.splitbrain.org/projects/monsterid, pp. 1.

* cited by examiner

*Primary Examiner* — Fikremariam A Yalew
(74) *Attorney, Agent, or Firm* — BainwoodHuang (57) ABSTRACT

A technique supports authentication of a server device (e.g., a web site). The technique involves supplying a user device (e.g., a client browser) with a user mechanism (e.g., a browser plug-in) which is constructed and arranged to dynamically generate user representations. The technique further involves receiving, at the server device, a request from the user device. The technique further involves providing a server representation to the user device from the server device in response to the request. The user device successfully authenticates the server device when a user representation dynamically generated by the user mechanism matches the server representation provided to the user device. However, the user device unsuccessfully authenticates the server device when the user representation dynamically generated by the user mechanism does not match the server representation provided to the user device.

21 Claims, 5 Drawing Sheets

AUTHENTICATING A SERVER DEVICE USING DYNAMICALLY GENERATED REPRESENTATIONS

BACKGROUND

Users of the Internet may be vulnerable to attackers attempting to steal their identities and other confidential data. Such sought after information includes names and addresses, user IDs and passwords, social security numbers, credit card information, and so on.

A phishing attack is a common tactic for obtaining confidential user information. Phishing involves the use of a web page that looks genuine but that actually belongs to the attacker. For example, an unsuspecting user may receive an email message indicating that the user has a billing problem. The email message instructs the user to go to a particular link which offers assistance. The link takes the user to a false web page that looks legitimate, and that deceivingly prompts the user to enter the confidential information.

A man-in-the-middle (or MITM) attack is another common tactic for obtaining confidential user information. Such an attack may even be able to defeat certain conventional encryption schemes. For example, suppose that a user intends to send confidential information to a particular destination (e.g., sign-on to a particular web site) using an untrained browser which nevertheless employs traditional Transport Layer Security (TLS) or Secure Sockets Layer (SSL) technology. When the browser inadvertently navigates to a phony web site rather than the legitimate web site, the phony web site offers its own public key and establishes a secure connection with the user's browser using TLS/SSL (e.g., the man-in-the-middle site decrypts messages from the user using its own private key). Concurrently, the man-in-the-middle site uses the same TLS/SSL scheme to establish a secure connection with the legitimate web site by obtaining the legitimate web site's public key for secure communications with the legitimate web site. Furthermore, the man-in-the-middle site may carry out a similar TLS/SSL exchange in the opposite direction (i.e., upstream) and thus operate as a man-in-the-middle for communications from the legitimate web site back to the user's browser. At this point, the man-in-the-middle site is conveniently poised to intercept confidential information that the user exchanges with the user's intended destination.

One conventional approach to avoiding succumbing to such attacks involves the user authenticating a site based on viewing a pre-chosen visual image from that site prior to exchanging confidential information with that site. That is, in advance, the user has decided on a particular visual image among multiple visual images that the legitimate site is capable of providing to its users. Then, each time the user goes to the legitimate site and prior to completing the sign-on process, the legitimate site provides the same pre-chosen visual image to the user to let the user know that it is the legitimate site. Since phishing and man-in-the-middle sites are not privy to the user's pre-chosen visual image, the user will easily know whether the site is genuine depending on whether the site is able to provide the pre-chosen visual image. Furthermore, with the pre-chose visual image being static (i.e., non-changing) over time, the user is able to grow accustomed to authenticating the legitimate site by viewing that same pre-chosen visual image each time the user goes to the legitimate site.

Once the user confirms that a site is legitimate by viewing the pre-chosen static visual image, the user is able to complete the sign-on process. Moreover, for additional security, some sign-on processes involve the use of one-time passwords (OTPs). One type of OTP expires after a certain amount of time. For example, the user may posses an authentication token which outputs a new OTP every minute for signing on at the legitimate site. Accordingly, even if an unauthorized person were to obtain an OTP from the user, the OTP would become invalid (i.e., unusable) at the legitimate site after a short period of time.

SUMMARY

An improved authentication technique involves the use of a dynamically generated representation (e.g., a unique code, symbol, pattern, small color picture, audio signal, etc.). In particular, parties on each end generate respective representations which can then be compared for authentication purposes. Authenticating devices and devices equipped with public key/private key encryption/decryption technology are particularly well-suited for the improved authentication technique. For example, an authenticating device is able to dynamically generate a series of different OTPs which can be used to select different representations over different periods of use, i.e., there is improved security since the representations are not static. Additionally, the public key of the standard TLS/SSL exchange can further be employed to select representations for matching and thus thwart attacks from a man-in-the-middle that must use its own public key rather than the public key of the legitimate site, i.e., in an man-in-the-middle attack the user would have the public key of the man-in-the-middle rather than the public key of the legitimate site and thus fail to generate a matching representation.

One embodiment of the invention is directed to a method of supporting authentication of a server device (e.g., a web site). The method includes supplying a user device (e.g., a client browser) with a user mechanism (e.g., a browser plug-in) which is constructed and arranged to dynamically generate user representations. The method further includes receiving, at the server device, a request from the user device. The method further includes providing a server representation (e.g., a visual image) to the user device from the server device in response to the request. The user device successfully authenticates the server device when a user representation dynamically generated by the user mechanism matches the server representation provided to the user device. However, the user device unsuccessfully authenticates the server device when the user representation dynamically generated by the user mechanism does not match the server representation provided to the user device.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Improved authentication techniques involve the use of dynamically generated representations (e.g., unique codes, symbols, patterns, color pictures, audio signals, etc.). In particular, parties on each end generate respective representations which are then matched for authentication purposes. Authenticating devices and devices equipped with public key/private key encryption/decryption technology are particularly well-suited for the improved authentication technique. For example, an authenticating device is able to dynamically provide a series of different OTPs which can be used to select different representations over different periods of use (i.e., there is improved security since the representations are not static). Additionally, the public key of the standard TLS/SSL exchange can further be employed to select representations for matching and thus thwart attacks from a man-in-the-middle that must use its own public key rather than the public key of the legitimate site (i.e., in an man-in-the-middle attack, the user would have the public key of the man-in-the-middle rather than the public key of the legitimate site and thus select a representation which doesn't match a representation provided by the legitimate site).

Figure 1:
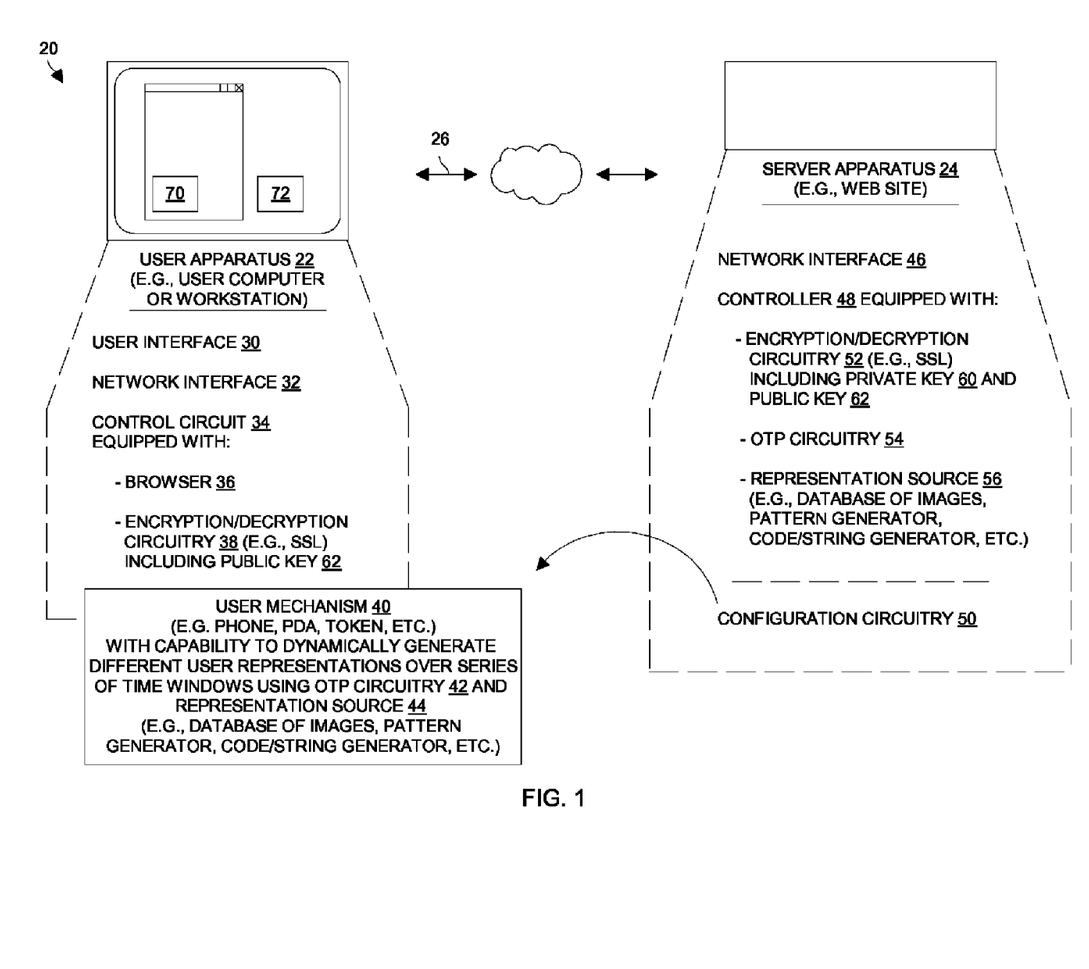
FIG. 1 is a diagram of an authentication system which enables authentication of a server device using dynamically generated representations.

FIG. 1 shows an authentication system 20 which enables authentication of a server device (e.g., a web site) using dynamically generated representations. The authentication system 20 includes user apparatus 22 and server apparatus 24. The user apparatus 22 and server apparatus 24 are capable of communicating with each other by exchanging electronic signals 26 over communications media 28 (illustrated by the network cloud 28). The communications media 28 is capable of including a variety of communications subsystems (e.g., copper, fiber, wireless, combinations thereof, etc.) which are publicly accessible and which are thus susceptible to the presence of attackers (e.g., phishing attackers, man-in-the-middle attackers, etc.).

The user apparatus 22 is able to take a variety of electronic forms having utility to the user such as a general purpose computer or user workstation running specialized software, a handheld electronic device, a cable box/digital video recorder, and so on. To this end and as shown in FIG. 1, the user apparatus 22 includes a user interface 30 (e.g., a visual display, a speaker, a keyboard, a mouse, etc.), a network interface 32, and a control circuit 34, among other things. The control circuit 34 includes a browser 36 and encryption/decryption circuitry 38.

The user apparatus 22 is further equipped with a user mechanism 40 which is supplied by the server apparatus 24. The user mechanism 40 capable of dynamically generating different user representations (e.g., visual images, audio signals, etc.) over a series of time windows. To this end, the user mechanism 40 includes one-time password circuitry 42 and a representation source 44 (e.g., a database of images or sounds, a pattern generator, processing circuitry programmed to apply an algorithm to output a code or string, etc.).

The user mechanism 40 is capable of being deeply connected with the other components of the user apparatus 22 (e.g., in electronic communication with the other components) or loosely coupled (e.g., physically side-by-side). For instance, in some arrangements, supplying the user mechanism 40 includes tightly integrating the user mechanism 40 with the other components of the user apparatus 22 (e.g., installing a plug-in to the browser 36, installing the user mechanism 40 as an application on the same computer, connecting the user mechanism 40 to the computer via a cable or wirelessly, etc.). In other arrangements, the user mechanism 40 is simply local or adjacent to the other components (e.g., the user mechanism 40 is a standalone phone, PDA, token, etc.). In all of these arrangements, output from the user mechanism 40 can be easily compared to output from the control circuit 34.

The server apparatus 24 is able to take a variety of electronic forms to provide services to the user apparatus 22 such as a web site which carries out communications with the user in a secure manner (e.g., an online banking site, an online store, a specialized/secure server, etc.). To this end and as further shown in FIG. 1, the server apparatus 24 includes a network interface 46, a controller 48, and configuration circuitry 50. The controller 48 includes encryption/decryption circuitry 52, one-time password circuitry 54 and a representation source 56 (e.g., a database of images, a pattern generator, a processor programmed to apply an algorithm to output a code or string, etc.).

Prior to operation, the encryption/decryption circuitry 52 of the controller 48 is equipped with a private key 60 which is kept secret, and a public key 62 which is widely available for distribution. Such a key pair is well-suited for carrying out traditional cryptographic protocols that provide secure communications between devices over publicly accessible media. Accordingly, the encryption/decryption circuitry 38 of the user apparatus 22 is able to easily obtain the public key 62 of the server apparatus 24 through the communications media 28 (e.g., at the start of a sign-on process). As a result, the server apparatus 24 is well-provisioned for secure messaging among multiple user apparatus 22.

Also, prior to operation, the user mechanism 40 (i) is properly configured by the configuration circuitry 50 of the server apparatus 24 and (ii) is supplied to the user of the user apparatus 22. In particular, the configuration circuitry 50 loads both the OTP circuitry 42 of the user mechanism 40 and the OTP circuitry 54 in the server apparatus 24 with a common secret (e.g., a seed or key, etc.) and time synchronizes the operation of each OTP circuits 42, 54 to independently output matching series of one-time passwords (OTPs) over the same time periods (e.g., every minute).

In some arrangements, the configuration circuitry 50 resides at the same location as the other components of the server apparatus 24 (e.g., the web site is in charge of deploying authentication technology). In other arrangements, the configuration circuitry 50 is separate from the other components which form the server device (e.g., the user mechanism 40 is provided by a third-party authentication service hired by the administrator of the service apparatus 24).

Once the user mechanism 40 is with the user of the user apparatus 22, the system 20 is ready for normal operation. In particular, the user of the user apparatus 22 is now able to properly authenticate the server apparatus 24. To this end and with the intention of communicating directly with the server apparatus 24, the user sends out a request (e.g., see the electronic signals 26) through the communications media 28 (e.g., the user attempts to access a login page of a legitimate web site using the user interface 30). The user then receives a server representation 70 in response to the request. Additionally, the user obtains a dynamically generated user representation 72 from the user mechanism 40 (e.g., a browser plug-in renders the user representation 72 in window which is separate from the current browser window).

At this point, the user is able to easily compare the server representation 70 with the dynamically generated user representation 72. If the user representation 72 matches the server representation 70, the user considers the server apparatus 24 to be authentic and has confidence that there is no man-in-the-middle. However, if the user representation 72 does not match the server representation 70, the user cannot be sure that the server apparatus 24 is authentic and the possibility exists that there is a man-in-the-middle. Further details will now be provided with reference to FIG. 2.

Figure 2:
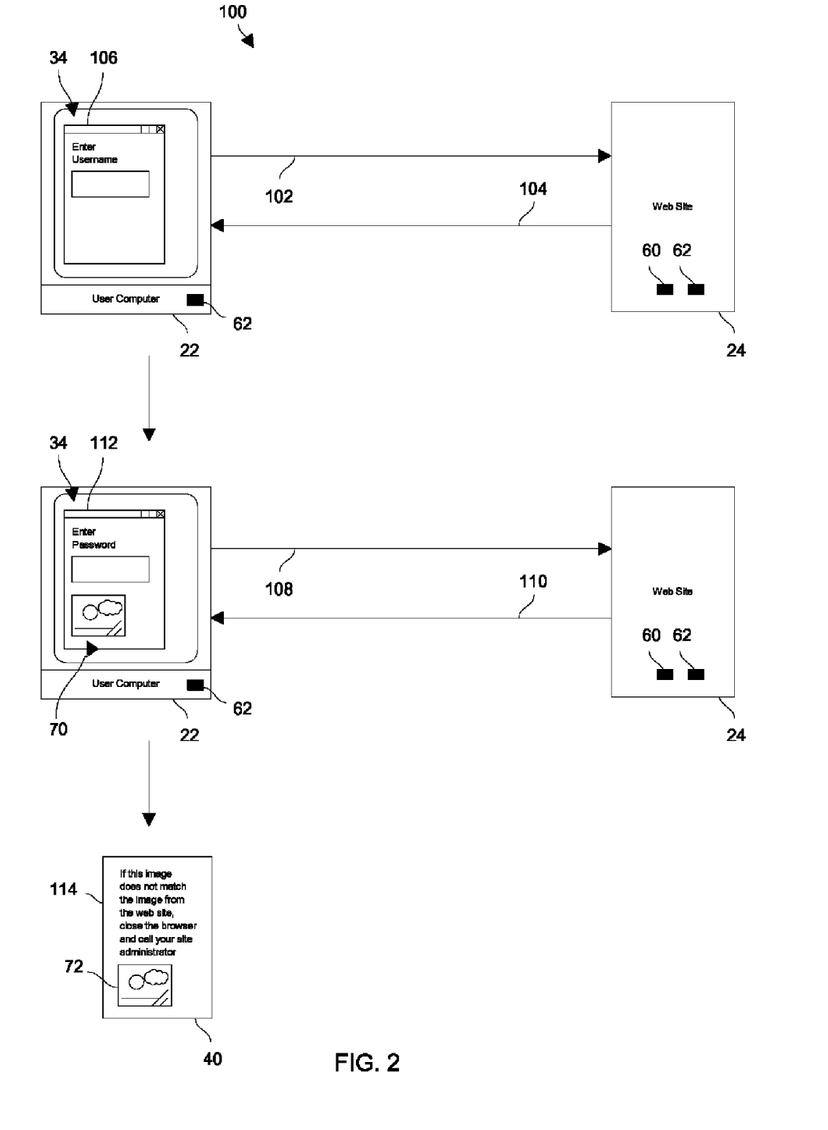
FIG. 2 is a diagram of the authentication system of FIG. 1 when there is a user-side/server-side exchange resulting in successful authentication of the server device.

FIG. 2 is a diagram 100 illustrating exchanges between the user apparatus 22 and the server apparatus 24 when there is no man-in-the-middle attacker. By way of example only, suppose that the user apparatus 22 is a computer under control of a user, and that the server apparatus 24 is a web site which the user wishes to access in a secure manner. Along these lines, the user operates the user interface 30 of the user apparatus 22, i.e., navigates using the browser 34 (also see FIG. 1) to begin a login process.

Initially, the user enters a navigation command directing the browser 34 to the web site. The control circuit 34 of the user apparatus 22 responds by sending a request 102 (e.g., a login request) through the network interface 32 (FIG. 1) to the server apparatus 24. In response to the request 102, the controller 48 of the server apparatus 24 sends a response 104 including a login page 106 and a digital certificate containing the public key 62.

Upon receipt of the response 104, the encryption/decryption circuitry 38 (FIG. 1) utilizes the public key 62 for secure handshaking (e.g., TLS, SSL, etc.) with the web site. That is, further communications between the user apparatus 22 and the server apparatus 24 utilize the encryption/decryption circuitry 38 of the user apparatus 22 for secure communications. Additionally, the browser 34 displays the login page 106 which prompts the user to enter a username.

Next, the user enters a username into the login page 106 and the control circuit 34 of the user apparatus 22 sends a new request 108 through the network interface 32 to the server apparatus 24 in a secure manner. In response to the new request 108, the controller 48 of the server apparatus 24 performs a series of steps to dynamically generate a server representation 70. In particular, the controller 48 looks up the username in its username roster to verify that the username is valid. The controller 48 then obtains a one-time password (OTP) from the OTP circuitry 54 which had been previously supplied with the same secret that was loaded into the user mechanism 40 and which had been carefully time synchronized with the user mechanism 40 in order to output server OTPs matching user OTPs of the user mechanism 40 over the same time periods. Then, the controller 48 dynamically generates the server representation 70 (e.g., a visual image) based on the obtained OTP by accessing the representation source 56 (FIG. 1). After that, the controller 48 sends a response 110 to the user apparatus 22 through the network interface 46 (FIG. 1) including a password page 112 and the server representation 70.

It should be understood that the controller 48 dynamically generates the server representation 70 non-arbitrarily based on the obtained OTP and the public key 60. In particular, the controller 48 encrypts the obtained OTP using the public key 60 to create an encryption result (i.e., a value). The controller 48 then generates the server representation 70 based on the encryption result. In some arrangements, the representation source 56 is a database of images (or alternatively sounds), and the controller 48 retrieves, as the server representation 70, a particular image using the encryption result as an index to the particular image. In other arrangements, the controller 48 uses the encryption result as an input parameter to a pattern generator (e.g., a specialized algorithm) which creates, as the server representation 70, a unique graphical pattern having certain shapes and colors which can be uniquely distinguished from other graphical patterns. In yet other arrangements, the controller 48 uses the encryption result as an input parameter to a code generator which outputs a unique code or string (e.g., a unique string of symbols) as the server representation 70.

Upon receipt of the response 110 from the server apparatus 24, the browser 34 of the user apparatus 22 displays the password page 112, which prompts the user to enter a password, and the server representation 70. Alternatively, the page 112 could prompt the user to provide other types of sensitive personal data (e.g., social security information, a date of birth, credit card information, salary information, etc.). At this point, the control circuit 48 communicates with the user mechanism 40. In arrangements where the user mechanism 40 is implemented as a browser plug-in, the control circuit 48 automatically triggers the user mechanism 40 to run, i.e., to dynamically generate a user representation 72. In arrangements where the user mechanism 40 is a separate device, the control circuit 48 delivers the public key 62 to the user mechanism 40 (e.g., via USB, Bluetooth, manual entry, etc.) for dynamic generation of the user representation 72.

In particular, dynamic generation of the user representation 72 by the user mechanism 40 is similar to the process of generating the server representation 70. That is, the OTP circuitry 42 of the user mechanism 40 provides a one-time password (OTP). Recall that the OTP circuitry 42 is configured to output matching OTPs of the OTP circuitry 54 of the server apparatus 24 over the same time periods. A user representation 72 is then similarly obtained from the representation source 44 of the user mechanism 40. In particular, the user mechanism 40 encrypts the OTP using the public key 62 of the server apparatus 24 to obtain an encryption result. The user mechanism 40 then dynamically generates the user representation 72 from the representation source 44 based on the encryption result.

Similarly, as mentioned above in connection with the server apparatus 24, the representation source 44 of the user mechanism 40 is a database of images, and the particular image is selected from the database using the encryption result as a database index in accordance with some arrangements. In other arrangements, the user mechanism 40 applies a pattern generating algorithm using the encryption result as an input parameter to create, as the server representation 70, a pattern having certain shapes and colors which can be uniquely distinguished from other patterns. In yet other arrangements, the user mechanism 40 applies a code generating algorithm using the encryption result as an input parameter to output a unique code or string as the server representation 70.

Once the user representation 72 is dynamically generated, the user mechanism 40 provides an output 114 which includes the user representation 72 for comparison with the server representation 70. In the context of a browser plug-in, the user representation 72 can be provided on the same user interface 30 that displays the server representation 70, e.g., a computer monitor. In the context of a separate device (e.g., a phone or PDA), the user representation 72 can be provided on a display of that separate device for side-by-side comparison. Additionally, the user mechanism 40 instructs the user to close the browser 36 if the representations 70, 72 do not match.

The server apparatus 24 is successfully authenticated to the user of the user apparatus 22 when the user representation 72 and the server representation 70 match. In this situation, the user enters the password into the password page 112 and continues to securely communicate with the server apparatus 24 through the user apparatus 22.

However, authentication of the server apparatus 24 is unsuccessful when the user representation 72 and the server representation 70 do not match. In this situation, the user closes the browser 34 (or the plug-in automatically closes the browser 34) rather than risk succumbing to a potential attacker (i.e., no sensitive personal data is released). Further details will now be provided with reference to FIG. 3.

Figure 3:
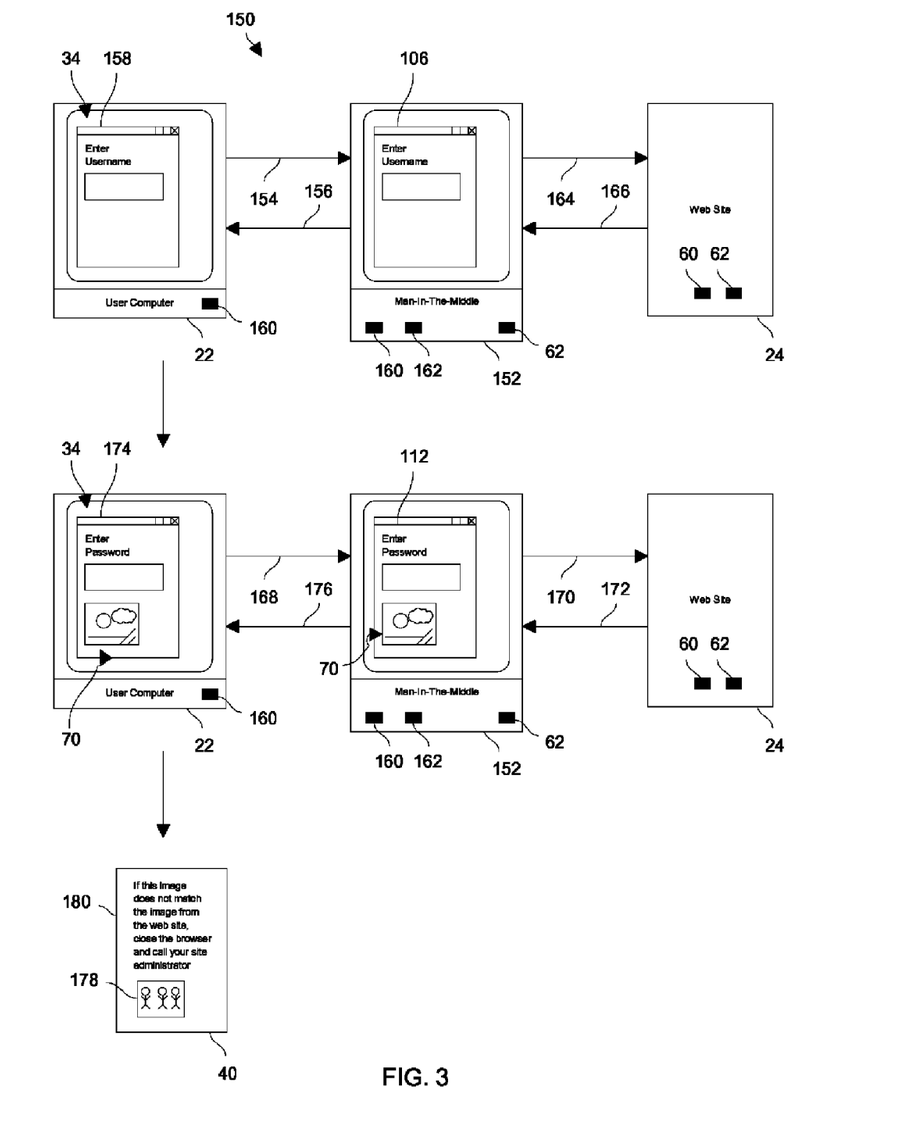
FIG. 3 is a diagram of the authentication system of FIG. 1 when there is an exchange resulting in unsuccessful authentication of the server device due to an attacker.

FIG. 3 is a diagram 150 illustrating exchanges between the user apparatus 22 and the server apparatus 24 when there is a man-in-the-middle attacker 152 present, e.g., an intermediately located false web site that attempts to portray itself as the legitimate web site while intercepting confidential data exchanged between the user apparatus 22 and the server apparatus 24. Although other architectures and circuit/device topologies are suitable, the example layout of FIG. 3 is purposefully similar to that of FIG. 2 (i.e., the user navigates the browser 34 attempting to reach the web site of the server apparatus 24) to simplify the explanation of how authentication of the server apparatus 24 fails in the presence of the man-in-the-middle attacker 152.

As shown in FIG. 3, the user enters a navigation command directing the browser 34 to the web site, i.e., the control circuit 34 of the user apparatus 22 responds by sending a request 154 through the network interface 32 (FIG. 1) to the server apparatus 24. However, the man-in-the-middle attacker 152 intercepts the request 154 and carries out an exchange with the user apparatus 22 in a manner similar to that of the server apparatus 24. Such a situation could occur if the user attempts to type in the domain name of the legitimate web site (e.g., "bank.com"), but inadvertently makes a typing error and navigates to the man-in-the-middle site 152 using the wrong domain name (e.g., "blank.com"). Other situations can occur to direct the unsuspecting user to the man-in-the-middle site 152.

As shown in FIG. 3, in response to the request 154, the man-in-the-middle attacker 152 sends a response 156 including a login page 158 and a digital certificate containing a public key 160 for the man-in-the-middle site 152. That is, the man-in-the-middle site 152 equips itself for secure handshaking in a similar manner to that of the legitimate web site using the public key 160 and an associated private key 162 in order to duplicate the operation of the legitimate web site as much as possible. Furthermore, the login page 158 from the man-in-the-middle site 152 prompts the user for a username and is purposefully identical in look and feel as that of the legitimate web site to fool the user.

At the same time, the man-in-the-middle site 152 attempts to portray itself as the actual user to the server apparatus 24 by sending a request 164 which is similar to the request 102 of FIG. 2. Accordingly, from the legitimate web site, the man-in-the-middle site 152 receives a response 166 similar to that of the response 104 of FIG. 2 which includes the legitimate login page 106 and the legitimate digital certificate containing the public key 62 of the server apparatus 24 (also see FIG. 2). To duplicate the operation of the user as much as possible, the man-in-the-middle site 152 receives the public key 62 from the server apparatus 24 and establishes secure handshaking with the server apparatus 24.

Upon receipt of the response 154 from the man-in-the-middle site 152, the encryption/decryption circuitry 38 of the user apparatus 22 (FIG. 1) utilizes the public key 160 of the man-in-the-middle site 152 for secure handshaking. Additionally, the browser 34 displays the login page 158 which prompts the user to enter a username.

Subsequently, the user enters a username into the login page 158 and the control circuit 34 of the user apparatus 22 sends a new request 168 through the network interface 32 to the man-in-the-middle site 152. Again, the user may not realize that the user is not communicating directly with the legitimate web site. In response to the new request 168, the man-in-the-middle site 152 sends its own new request 170 to the legitimate web site including the username it obtained from the unsuspecting user.

In turn, the controller 48 of the server apparatus 24 returns a response 172 including the password page 112 and the server representation 70 using the earlier described process. In particular, the OTP circuitry 54 provides a time synchronized OTP, the encryption/decryption circuitry 52 encrypts that OTP with the public key 62 to form an encryption result, and the representation source 56 provides the server representation 70 based on the encryption result (also see FIG. 2).

Upon receipt of the password page 112 and the server representation 70, the man-in-the-middle site 152 constructs its own similar looking password page 174 and then sends a response 176 including the password page 174 and the server representation 70 to the user apparatus 22. Again, the password page 174 is purposefully made to look and behave like the legitimate password page 112.

When the user apparatus 22 receives the response 176 from the man-in-the-middle site 152, the browser 34 of the user apparatus 22 displays the password page 174, which prompts the user to enter a password, and the server representation 70. Additionally, the control circuit 34 of the user apparatus 22 provides the public key 160 of the man-in-the-middle site 152 to the user mechanism 40 and directs the user mechanism 40 to run. In response, the OTP circuitry 42 of the user mechanism 40 provides a one-time password OTP, and the user mechanism 40 encrypts that OTP using the public key 160 of the man-in-the-middle site 152 to obtain an encryption result. Next, the user mechanism 40 dynamically generates a user representation 178 from the representation source 44 based on the encryption result.

It is important to note that the user representation 178 is different from the user representation 72 (FIG. 2) because different public keys were used to create an encryption result from the OTP. In particular, the user representation 72 which properly matches the server representation 70 was obtained using an encryption result from encrypting the OTP with the server apparatus' public key 62. In contrast, the user representation 178 does not match the server representation 70 since the user representation 178 was obtained using an encryption result from encrypting the OTP with the public key 160 from the man-in-the-middle site 152.

Once the user representation 178 is dynamically generated, the user mechanism 40 provides an output 180 which includes the user representation 178 for comparison with the server representation 70. Furthermore, the user mechanism 40 instructs the user to close the browser 34 if the representations 70, 178 do not match. In the situation of FIG. 3, the user representation 178 does not match the server representation 70. Accordingly, authentication of the server apparatus 24 is unsuccessful and the user closes the browser 34. As a result, the user does not succumb to man-in-the-middle attack, and the user's confidential data remains secure.

It should be understood that the public key 62 of the server apparatus 24 cannot be introduced for use by the user mechanism 40 because the private key 60 of the server apparatus 24 is kept secret by the server apparatus. As a result, all communications from the user apparatus 22 which are encrypted by the public key 62 of the server apparatus 24 are unusable by the man-in-the-middle site 152.

The user is further safeguarded against phishing attacks for the same reasons. In particular, a phishing site will not be able to successfully use the private key 60 and public key 62 of the server apparatus 24 since the private key 60 is kept secret by the server apparatus 24. That is, all communications from the user apparatus 22 which are encrypted by the public key 62 of the server apparatus 24 are unusable by the phishing site since the phishing site cannot decrypt the communications without the private key 60 of the server apparatus 24. Details of the operation of the user apparatus 22 will now be further provided and reviewed with reference to FIG. 4.

Figure 4:
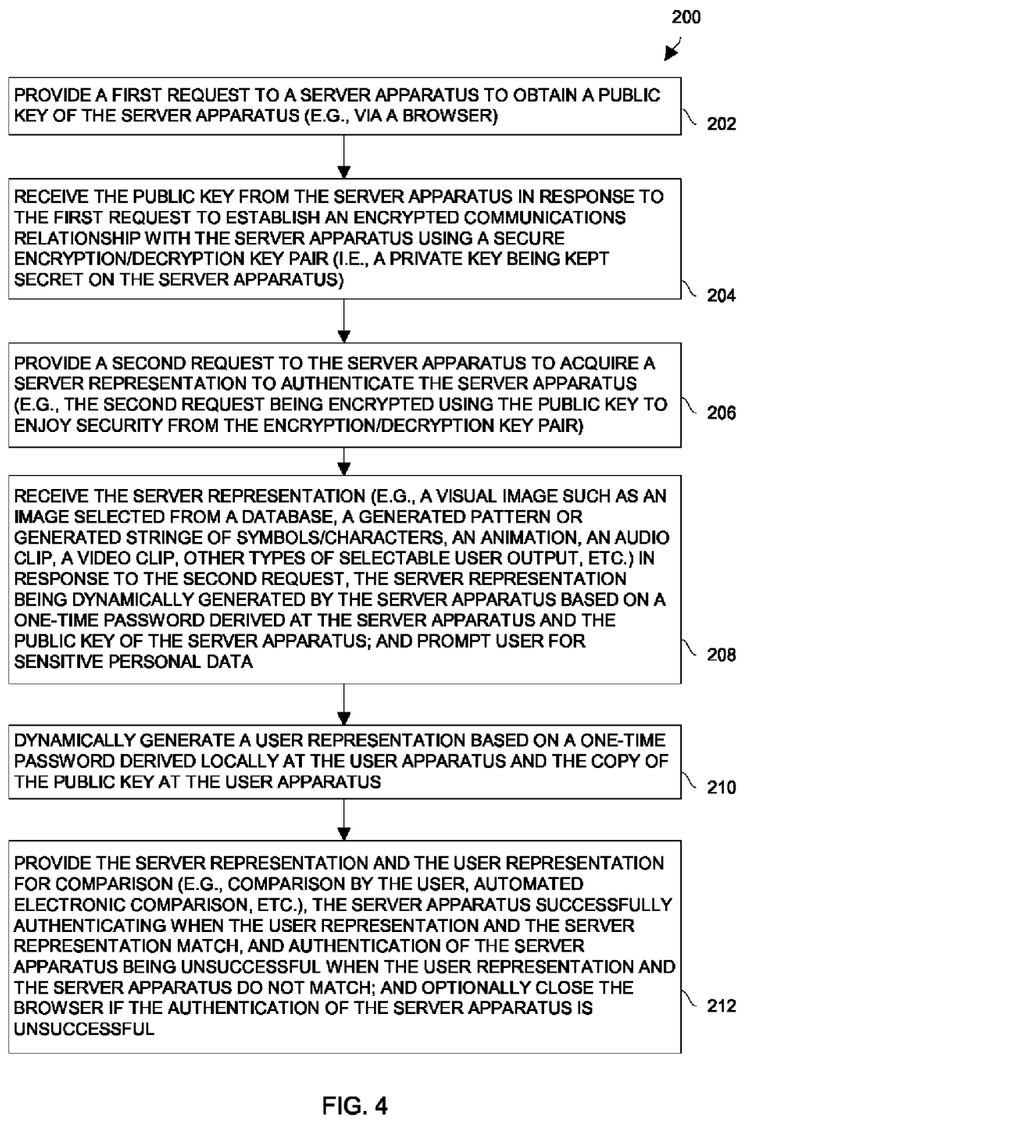
FIG. 4 is a flowchart of a procedure which is performed by user apparatus of the authentication system of FIG. 1.

FIG. 4 is a flowchart of a procedure 200 which is performed by the user apparatus 22 of the authentication system 20 (also see FIG. 1). In step 202, the user apparatus 22 provides a first request 102 (also see FIG. 2) to the server apparatus 24 to begin a sign-on process with the server apparatus 24.

In step 204, the user apparatus 22 receives a login page 102 and the public key 60 from the server apparatus 24 (also see FIG. 2) to establish an encrypted communications session using a secure encryption/decryption key pair. In particular, the private key 60, which is capable of decrypting messages which are encrypted by the public key 62, is kept secret by the server apparatus 24. At this point, all further communications to the server apparatus 24 are preferably encrypted using the user apparatus' local copy of the public key 62.

In step 206, the user apparatus 22 provides another request 108 along with a username (FIG. 2) to the server apparatus 24 to acquire the server representation 70. As mentioned earlier, the server apparatus 24 dynamically generates the server representation 70 based on a time synchronized OTP and the public key 62. In particular, the server apparatus 24 obtains a current OTP (i.e., in real time) and encrypts that OTP with the public key 62 to form an encryption result. The server apparatus 24 then uses the encryption result as an input to generate the server representation 70.

In step 208, the user apparatus 22 receives a password page 112 and the server representation 70 from the server apparatus 24 in response to the request 108. The user apparatus 22 is then capable of outputting the server representation 70 to the user (e.g., rendering a visual image on the browser 34, or providing an audio or video clip, etc.).

In step 210, the user apparatus 22 dynamically generates the user representation 72 in a manner similar to that used by the server apparatus 24. In particular, the user mechanism 40 dynamically generates the user representation 72 based on the time synchronized OTP and the public key 62 of the server apparatus 24.

In step 212, the user apparatus 22 provides the user representation 72 to the user for comparison with the server representation 70. The server apparatus 24 is successfully authenticated when the user representation 72 matches the server representation 70. However, the server apparatus 24 authentication is unsuccessful when the user representation 72 does not match the server representation 70. The user should only provide password information if the server apparatus 24 has successfully authenticated. Details of the operation of the server apparatus 24 will now be further provided and reviewed with reference to FIG. 5.

Figure 5:
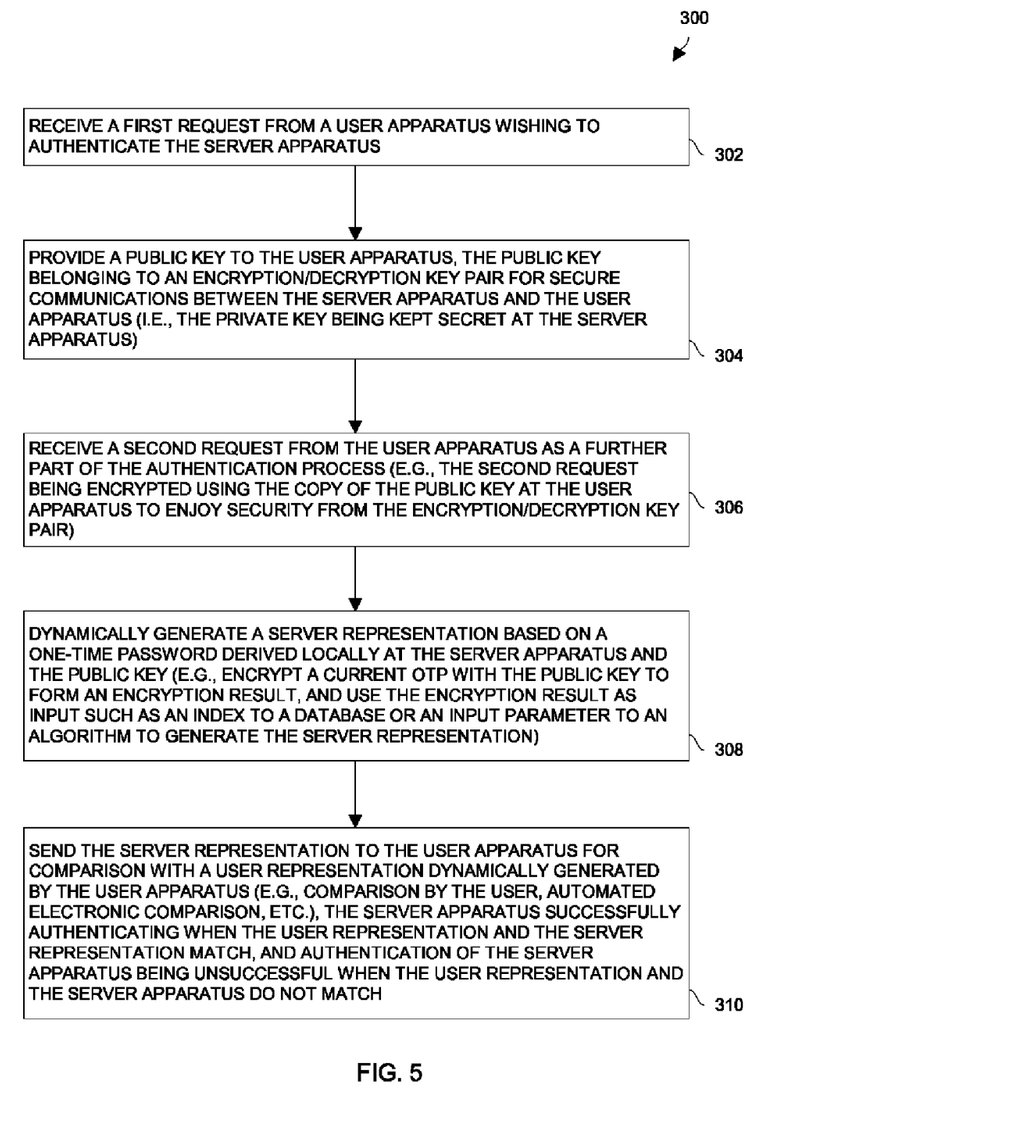
FIG. 5 is a flowchart of a procedure which is performed by server apparatus of the authentication system of FIG. 1.

FIG. 5 is a flowchart of a procedure 300 which is performed by the server apparatus 24 of the authentication system 20 (also see FIG. 1). In step 302, the server apparatus 24 receives a first request 102 (also see FIG. 2) from the user apparatus 22 when the user at the user apparatus 22 wishes to authenticate the server apparatus 24 (e.g., at the beginning of a login exchange).

In step 304, the server apparatus 24 provides a login page 102 (FIG. 2) and the public key 62 to the user apparatus 22 to establish an encrypted communications session using a secure encryption/decryption key pair. In particular, the private key 60 of the key pair is capable of decrypting messages which are encrypted by the public key 62 and is kept secret by the server apparatus 24. The public key 62 of the key pair is available for wide distribution, e.g., to multiple user apparatus wishing to establish a secure session. At this point, all further communications from the user apparatus 22 are preferably encrypted.

In step 306, the server apparatus 24 receives another request 108 (FIG. 2) containing the user's username from the user apparatus 22 as a further part of the authentication process. This second request 108 is received in encrypted form due to the user apparatus 22 sending the request 108 using the established encrypted session. The server apparatus 24 is then able to decrypt the request 108.

In step 308, the server apparatus 24 dynamically generates the server representation 70 based on a time synchronized OTP and the public key 62. As described earlier, the OTP is obtained locally from the OTP circuitry 54 of the server apparatus 24, and is then encrypted to form an encryption result. This encryption result is then used as an input (e.g., an index, a parameter to an algorithm, etc.) for dynamic generation of the server representation 70.

In step 310, the server apparatus 24 sends a password page 112 and the server representation 70 to the user apparatus 22 in response to the request 108. At this point, the user apparatus 22 is able to dynamically generate the user representation 72 for comparison with the server representation 70. The user representation 72 is similarly based on a locally obtained time synchronized OTP and the user apparatus' local copy of the public key 62 from the server apparatus 24. The server apparatus 24 is successfully authenticated when the user representation 72 matches the server representation 70. Additionally, the server apparatus 24 authentication is unsuccessful when the user representation 72 does not match the server representation 70. A careful user will then discontinue further communications with the server apparatus 24 and contact an administrator if authentication of the server apparatus 24 is unsuccessful.

As described above, an improved authentication technique involves the use of dynamically generated representations 70, 72 (e.g., unique codes, symbols, patterns, small color pictures, audio signals, etc.). In particular, apparatus 22, 24 on each end generate respective representations 70, 72 which can then be compared for authentication purposes. Authenticating devices (e.g., tokens) and devices equipped with public key/private key encryption/decryption technology (e.g., TLS and SSL equipped devices) are particularly well-suited for the improved authentication technique. For example, an authenticating device is able to dynamically generate a series of different OTPs which can be used to select different representations over different periods of use, i.e., there is improved security since the representations are not static. Additionally, the public key 62 of an encryption/decryption key pair can further be employed to select representations for matching and thus thwart attacks from a man-in-the-middle that must use its own public key 160 rather than the public key 62 of the legitimate site, i.e., in an man-in-the-middle attack the user would have the public key 160 of the man-in-the-middle rather than the public key 62 of the legitimate site and thus fail to generate a matching representation.

While various embodiments of the invention have been particularly shown and described, it will be understood by those skilled in the art that various changes in form and details may be made therein without departing from the spirit and scope of the invention as defined by the appended claims.

For example, the authentication system 20 was described above as having a user computer and a web site as the parties at each end by way of example only. It should be understood that the above-described improved techniques are well-suited for a variety of other applications. In some arrangements, the user apparatus 22 are relatively small and/or compact (e.g., hand-held or remote devices such as phones and PDAs). In some arrangements, the user apparatus 22 are relatively large (e.g., large-scale equipment, etc.).

Additionally, it should be understood that the representations 70, 72 were described above as visual images by way of example only. There are a variety of other suitable types of representations including video clips, animation sequences, audio clips, character/symbol strings, other types of selectable user output, and so on.

Furthermore, it should be understood that the user apparatus 22 was described as including a browser 36 for user input/output by way of example only. Other applications are suitable for use as well. In particular, in some arrangements, the user enters input (e.g., a username, a password, other user data, etc.) and receives output (e.g., language prompting the user to enter information, the server representation 70, etc.) using a non-browser application (e.g., a specialized GUI, etc.).

Additionally, it should be understood that the OTPs used in the authentication system 20 were described above as time-based OTPs. Such OTPs may be obtained by various OTP algorithms (e.g., derived from a seed or key, rolling through a sequence of random numbers, incrementing an index, hashing and/or combining values, combinations thereof, and so on).

In other arrangements, the OTPs used in the authentication system 20 are event-based OTPs rather than time-based. Such OTPs are preferably obtained by an event-based algorithm in response to an event. For example, the user apparatus 22 obtains its OTP in response to an event such as a button press which increments a counter. The server apparatus 24 obtains its OTP in response to the request from the user apparatus 22 which increments another counter on its end, with the user apparatus 22 and the server apparatus being synchronized on their counters. Accordingly, the operation of the OTP circuits 42, 54 remains synchronized to independently output matching series of OTPs (e.g., based on a shared incrementing or decrementing index). Such modifications and enhancements are intended to belong to various embodiments of the invention.

What is claimed is:

1. A method of supporting authentication of a server device, the method comprising:
   supplying a user device with a user mechanism which is constructed and arranged to dynamically generate user representations;
   receiving, at the server device, a request from the user device; and
   providing a server representation to the user device from the server device in response to the request, the server device being successfully authenticated to a user of the user device when a user representation dynamically generated by the user mechanism matches the server representation provided to the user device, and the server device not being successfully authenticated to the user of the user device when the user representation dynamically generated by the user mechanism does not match the server representation provided to the user device;
   wherein providing the server representation to the user device includes:
      obtaining a server password from a server one-time password (OTP) circuit, the server password being based on a particular secret and current time, and the server OTP circuit being constructed and arranged to provide a series of server passwords over a series of predefined time windows,
      generating the server representation based on the server password obtained from the server OTP circuit, and
      sending the server representation to the user device;
   wherein the server OTP circuit is synchronized with a user OTP circuit at the user mechanism so that the server representation matches the user representation when the user representation is generated by the user OTP circuit based on the particular secret and the same current time;
   wherein the user device has a public key and the server device has a private key, the public key and the private key forming a secure encryption/decryption key pair enabling the server device to securely decrypt encrypted messages sent from the user device over a public network; and
   wherein generating the server representation based on the server password obtained from the server OTP circuit includes (i) obtaining an encryption result from encrypting the server password using the public key and (ii) deriving the server representation based on the encryption result.

2. A method as in claim 1 wherein the server device includes a database of images which are selectable from the database based on indexes; and wherein deriving the server representation based on the encryption result includes:
   creating an index based on the encryption result, and
   selecting, as the server representation, a particular image from the database using the index.

3. A method as in claim 1 wherein deriving the server representation based on the encryption result includes:
   creating an input parameter based on the encryption result, and
   forming, as the server representation, a unique graphical pattern having different shapes and different colors, the different shapes and different colors being dependent on a pattern generation algorithm which takes, as an input, the input parameter.

4. A method as in claim 1 wherein deriving the server representation based on the encryption result includes:
   creating an input parameter based on the encryption result, and
   creating, as the server representation, a unique character string based on a character string generation algorithm which takes, as an input, the input parameter.

5. A method as in claim 1 wherein the server device includes a database of entries which reference user output and which are selectable from the database based on indexes; and wherein deriving the server representation based on the encryption result includes:
   creating an index based on the encryption result, and
   selecting, as the server representation, a particular entry from the database using the index, the particular entry referencing particular user output which includes at least one of an animation, a video clip and a sound clip.

6. A method as in claim 1 wherein the user device runs a browser application; and wherein supplying the user device with the user mechanism which is constructed and arranged to dynamically generate user representations includes:

adding a plug-in to the browser application, the plug-in being constructed and arranged to operate in tandem with the browser application to dynamically generate different user representations over the series of predefined time windows.

7. A method as in claim 6, further comprising:
prompting a user of the user device to provide a user password to the server device through the browser application only if the user concludes that the user representation matches the server representation.

8. A method as in claim 6, further comprising:
prompting a user of the user device to provide sensitive personal data to the server device through the browser application only if the user concludes that the user representation matches the server representation.

9. A method as in claim 1 wherein supplying the user device with the user mechanism which is constructed and arranged to dynamically generate user representations includes:
providing, to the user, a separate device constructed and arranged to be physically adjacent to the user device, the separate device having a display being constructed and arranged to visually present the user representation to the user.

10. A method as in claim 1, wherein supplying the user device with a user mechanism includes:
providing the public key to the user mechanism, the user mechanism being configured to generate a user representation by encrypting the user OTP with the public key.

11. A method as in claim 1, wherein the request from the user device is encrypted using the public key;
wherein receiving the request from the user device includes:
decrypting the request with a private key that forms a public/private key pair with the public key.

12. A method of supporting authentication of a server device, the method comprising:
supplying a user device with a user mechanism which is constructed and arranged to dynamically generate user representations;
receiving, at the server device, a request from the user device; and
providing a server representation to the user device from the server device in response to the request, the server device being successfully authenticated to a user of the user device when a user representation dynamically generated by the user mechanism matches the server representation provided to the user device, and the server device not being successfully authenticated to the user of the user device when the user representation dynamically generated by the user mechanism does not match the server representation provided to the user device;
wherein providing the server representation to the user device includes:
obtaining a server password from a server one-time password (OTP) circuit, the server password being based on a particular secret and an event,
generating the server representation based on the server password obtained from the server OTP circuit, and
sending the server representation to the user device;
wherein the server OTP circuit is synchronized with a user OTP circuit at the user mechanism so that the server representation matches the user representation when the user representation is generated by the user OTP circuit based on the particular secret and the event;

wherein the user device has a public key and the server device has a private key, the public key and the private key forming a secure encryption/decryption key pair enabling the server device to securely decrypt encrypted messages sent from the user device over a public network; and
wherein generating the server representation based on the server password obtained from the server OTP circuit includes (i) obtaining an encryption result from encrypting the server password using the public key and (ii) deriving the server representation based on the encryption result.

13. A method for supporting authentication of a server device, the method comprising:
providing a request from a user device to the server device;
receiving, at the user device, a server representation from the server device in response to the request; and
dynamically generating a user representation using a user mechanism which is local to the user device, the server device being successfully authenticated when the user representation dynamically generated using the user mechanism matches the server representation from the server device, and the server device not being successfully authenticated when the user representation dynamically generated using the user mechanism does not match the server representation from the server device;
wherein dynamically generating the user representation using the user mechanism includes:
obtaining a user password from a user one-time password (OTP) circuit at the user device, the user password being based on a particular secret and current time, and the user OTP circuit being constructed and arranged to provide a series of user passwords over a series of predefined time windows, and
generating the user representation based on the user password obtained from the user OTP circuit;
wherein the user OTP circuit at the user device is time synchronized with a server OTP circuit so that the user representation matches the server representation when the server representation is generated by the server OTP circuit based on the particular secret and the same current time;
wherein the user device has a public key and the server device has a private key, the public key and the private key forming a secure encryption/decryption key pair enabling the user device to encrypt messages and securely send the encrypted messages over a public network for decryption by the server device; and
wherein generating the user representation based on the user password obtained from the user OTP circuit includes (i) obtaining an encryption result from encrypting the user password using the public key and (ii) deriving the user representation based on the encryption result.

14. Electronic apparatus, comprising:
configuration circuitry constructed and arranged to supply a user device with a user mechanism which is configured to dynamically generate user representations; and
a server device constructed and arranged to receive a request from the user device and, in response to the request, send a server representation to the user device, the server device being successfully authenticated to a user of the user device when a user representation dynamically generated by the user mechanism matches the server representation provided to the user device, and the server device not being successfully authenticated to the user of the user device when the user representation dynamically generated by the user mechanism does not match the server representation provided to the user device; wherein the server device includes:
- a server one-time password (OTP) circuit constructed and arranged to provide a series of server passwords over a series of predefined time windows; and
- a controller coupled to the server OTP circuit, the controller, when server device sends the server representation to the user device, being constructed and arranged to:
  - obtain a server password from the server OTP circuit, the server password being based on a particular secret and current time,
  - generate the server representation based on the server password obtained from the first OTP circuit, and
  - send the server representation to the user device; and
- wherein the server OTP circuit is time synchronized with a user OTP circuit at the user mechanism supplied to the user device so that the server representation matches the user representation when the user representation is generated by the user OTP circuit based on the particular secret and the same current time;
- wherein the user device has a public key and the server device has a private key, the public key and the private key forming a secure encryption/decryption key pair enabling the server device to securely decrypt encrypted messages sent from the user device over a public network; and
- wherein the controller of the server device, when generating the server representation based on the server password obtained from the first OTP circuit, is constructed and arranged to: (i) obtain an encryption result from encrypting the server password using the public key and (ii) derive the server representation based on the encryption result.

15. Electronic apparatus as in claim 14 wherein the server device further includes:
- a database of images which are selectable from the database based on indexes; and
- wherein the controller, when deriving the server representation based on the encryption result, is constructed and arranged to (i) create an index based on the encryption result, and (ii) select, as the server representation, a particular image from the database using the index.

16. Electronic apparatus as in claim 14 wherein the controller, when deriving the server representation based on the encryption result, is constructed and arranged to:
- create an input parameter based on the encryption result, and
- form, as the server representation, a unique graphical pattern having different shapes and different colors, the different shapes and different colors being dependent on a pattern generation algorithm which takes, as an input, the input parameter.

17. Electronic apparatus as in claim 14 wherein the controller, when deriving the server representation based on the encryption result, is constructed and arranged to:
- create an input parameter based on the encryption result, and
- create, as the server representation, a unique character string based on a character string generation algorithm which takes, as an input, the input parameter.

18. Electronic apparatus as in claim 14 wherein the user device runs a browser application; and wherein the configuration circuitry, when supplying the user device with the user mechanism, is constructed and arranged to:
- add a plug-in to the browser application, the plug-in being constructed and arranged to operate in tandem with the browser application to dynamically generate different user representations over the series of predefined time windows.

19. Electronic apparatus as in claim 18 wherein the server device is further constructed and arranged to:
- prompt a user of the user device to provide a user password through the browser application only if the user concludes that the user representation matches the server representation.

20. Electronic apparatus as in claim 18 wherein the plug-in is constructed and arranged to automatically close the browser application after comparison of the user representation and the server representation when the user representation does not match the server representation.

21. Electronic apparatus, comprising:
- a user mechanism constructed and arranged to dynamically generate user representations;
- an interface constructed and arranged to communicate with a server device; and
- a control circuit coupled to the interface, the control circuit being constructed and arranged to:
  - provide a request to the server device through the interface,
  - receive, in response to the request, a server representation from the server device through the interface, and
  - direct the user mechanism to dynamically generate a user representation, the server device being successfully authenticated when the user representation dynamically generated by the user mechanism matches the server representation from the server device, and the server device not being successfully authenticated when the user representation dynamically generated by the user mechanism does not match the server representation from the server device;
- wherein the user mechanism includes:
  - a user one-time password (OTP) circuit constructed and arranged to provide a series of user passwords over a series of predefined time windows, and
  - an output circuit coupled to the user OTP circuit, the output circuit, when the user mechanism is directed by the control circuit to dynamically generate the user representation, being constructed and arranged to: (i) obtain a user password from the user OTP circuit, the user password being based on a particular secret and current time, and (ii) generate the user representation based on the user password obtained from the user OTP circuit; and
- wherein the user OTP circuit is synchronized with a server OTP circuit so that the user representation matches the server representation when the server representation is generated by the server OTP circuit based on the particular secret and the same current time;
- wherein the control circuit has a public key and the server device has a private key, the public key and the private key forming a secure encryption/decryption key pair enabling the control to encrypt messages and securely send the encrypted messages through the interface over a public network for decryption by the server device; and
- wherein the user mechanism, when generating the user representation based on the user password obtained from the user OTP circuit, is constructed and arranged to (i) obtain an encryption result from encrypting the user password using the public key and (ii) derive the user representation based on the encryption result.

* * * * *